United States Patent
Ferrara et al.

(10) Patent No.: US 9,676,920 B2
(45) Date of Patent: Jun. 13, 2017

(54) POLYOLEFIN NANOCOMPOSITES MATERIALS

(75) Inventors: Giuseppe Ferrara, Ferrara (IT); Enrico Costantini, Ferrara (IT); Marco Consalvi, Occhiobello (IT)

(73) Assignee: Basell Poliolefine Italia S.r.l., Milan (IT)

( * ) Notice: Subject to any disclaimer, the term of this patent is extended or adjusted under 35 U.S.C. 154(b) by 226 days.

(21) Appl. No.: 12/734,858

(22) PCT Filed: Oct. 15, 2008

(86) PCT No.: PCT/EP2008/063819
§ 371 (c)(1),
(2), (4) Date: May 27, 2010

(87) PCT Pub. No.: WO2009/068365
PCT Pub. Date: Jun. 4, 2009

(65) Prior Publication Data
US 2010/0304068 A1    Dec. 2, 2010

Related U.S. Application Data

(60) Provisional application No. 61/005,731, filed on Dec. 7, 2007.

(30) Foreign Application Priority Data

Nov. 27, 2007  (EP) ..................... 07121629

(51) Int. Cl.
| | |
|---|---|
| B32B 1/08 | (2006.01) |
| B32B 5/02 | (2006.01) |
| C08J 3/22 | (2006.01) |
| C08K 3/22 | (2006.01) |
| C08K 3/26 | (2006.01) |
| C08L 23/20 | (2006.01) |
| C08L 51/06 | (2006.01) |

(52) U.S. Cl.
CPC ............... C08K 3/26 (2013.01); C08L 23/20 (2013.01); C08L 51/06 (2013.01); Y10T 428/139 (2015.01); Y10T 442/60 (2015.04)

(58) Field of Classification Search
CPC .......... C08L 23/02; C08L 23/20; C08L 51/06; C08L 2666/24; C01P 2022/22; Y10T 428/139; Y10T 428/1393; Y10T 428/1397; C08J 5/005; B82Y 30/00
USPC .................. 428/36.9, 36.91, 36.92; 523/322; 524/436, 394, 400, 437, 504, 445
See application file for complete search history.

(56) References Cited

U.S. PATENT DOCUMENTS

| | | |
|---|---|---|
| 4,299,759 A | 11/1981 | Miyota et al. |
| 4,611,024 A | 9/1986 | Wolfe |
| 5,814,697 A * | 9/1998 | Akao et al. ................... 524/495 |
| 5,910,523 A | 6/1999 | Hudson |
| 6,270,209 B1 | 8/2001 | Shimomura |
| 6,451,897 B1 | 9/2002 | Niyogi |
| 7,160,964 B2 | 1/2007 | Bigiavi et al. |
| 2002/0156171 A1 | 10/2002 | Drewniak et al. |
| 2002/0161093 A1 * | 10/2002 | Nakashima et al. .......... 524/436 |
| 2003/0092816 A1 | 5/2003 | Mehta et al. |
| 2003/0220434 A1 | 11/2003 | Robello et al. |
| 2003/0232912 A1 | 12/2003 | Rosenthal et al. |
| 2004/0225066 A1 * | 11/2004 | Flat ..................... B29C 37/0075 525/178 |
| 2005/0256243 A1 | 11/2005 | Mehta et al. |
| 2006/0057374 A1 | 3/2006 | Sartori et al. |
| 2007/0142534 A1 * | 6/2007 | Moad et al. .................. 524/445 |
| 2009/0209157 A1 | 8/2009 | Ferrara et al. |
| 2009/0239067 A1 * | 9/2009 | Verlaan et al. ............... 428/339 |

FOREIGN PATENT DOCUMENTS

| | | |
|---|---|---|
| EP | 0121756 | 10/1984 |
| EP | 0449092 | 10/1991 |
| EP | 0474322 | 3/1992 |
| EP | 0659815 | 6/1995 |
| EP | 1219678 | 7/2002 |
| JP | 2005500971 A | 1/2005 |
| WO | WO-9903673 | 1/1999 |
| WO | WO-0190236 | 11/2001 |
| WO | WO-0196467 | 12/2001 |
| WO | WO-03018478 A2 | 3/2003 |
| WO | WO-03059917 | 7/2003 |
| WO | WO-04000895 | 12/2003 |
| WO | WO-2004029342 | 4/2004 |
| WO | WO 2006/131450 | * 12/2006 ............. C08L 23/02 |

* cited by examiner

Primary Examiner — Lee E Sanderson

(57) ABSTRACT

A polyolefin nanocomposite material comprising the following components:
(A) a crystalline or semi-crystalline polyolefin resin; and
(B) a nanosized mineral filler comprising or substantially consisting of a hydrotalcite, wherein the amount of the hydrotalcite is from 0.02 to 6 parts by weight per 100 parts by weight of the nanocomposite material, and the ratio MFR (1)/MFR (2) of the melt flow rate value MFR (1) of component (A) to the melt flow rate value MFR (2) of the polyolefin nanocomposite material is of at least 1.02,
characterized in that
the said polyolefin nanocomposite material includes a compatibilizer
the dispersion of the mineral filler (B) and compatibilizer in the polyolefin resin is produced at shear mixing rates from 30 to 300 $\sec^{-1}$.

2 Claims, No Drawings

POLYOLEFIN NANOCOMPOSITES MATERIALS

This application is the U.S. national phase of International Application PCT/EP2008/063819, filed Oct. 15, 2008, claiming priority to European Patent Application 07121629.5 filed Nov. 27, 2007, and the benefit under 35 U.S.C. 119(e) of U.S. Provisional Application No. 61/005,731, filed Dec. 7, 2007; the disclosures of International Application PCT/EP2008/063819, European Patent Application 07121629.5 and U.S. Provisional Application No. 61/005,731, each as filed, are incorporated herein by reference.

The present invention relates to polyolefin nanocomposite materials comprising a polyolefin and at least one nanosized hydrotalcite mineral filler and to a process for preparing such materials. It also relates to articles and particularly to fibers and films, sheets and blisters and cups and closures, thermoformed, blow molded and injection molded (IM) articles and pipes formed from said materials.

Particularly, the present invention concerns fibers exhibiting a good balance of tenacity, and elongation at break. It also relates to films or sheets for thermoforming or blisters exhibiting good barrier properties, good stiffness and optical properties. It also relates to pipes exhibiting improved thermomechanical properties. The polyolefin nanocomposite materials of the present invention exhibit improved processability versus similar nanocomposites based on smectite clays and nanozeolites. Smectite clays include, for example, montmorillonite, saponite, beidellite, hectorite, bohemite and stevensite.

As used herein the term "nanosized filler" means a filler with at least one dimension (length, width or thickness) in the range from about 0.2 to about 500 nanometers.

The definition of fibres includes continuous fibres, staple fibres and/or filaments produced with the spunlaid process and spunbond non woven process, tapes and monofilaments.

The polyolefin fibres according to the present invention are particularly adequate for the use in building and construction, in industrial, in agricultural, in cloth-like applications and hygiene products.

The definition of films includes cast, blown and biaxially oriented films, particularly biaxially oriented polypropylene films (BOPP), adequate for the use in food and tobacco packaging and tapes.

The definition of injection molded articles includes injection stretch blow molding articles such as bottles.

Thermoformed articles include all packaging applications rigid and semi-rigid such as cups and closures.

Composites comprising a polyolefin resin and a nanosized mineral filler in low amounts are already known. Efforts have been made to increase the compatibility phenomena between the said two components of different chemical nature, in order to improve the mechanical, thermal and barrier properties of the polyolefin nanocomposite material.

For example, U.S. Pat. No. 5,910,523 describes polyolefin nanocomposite materials comprising a semi-crystalline polyolefin and a nanosized mineral filler wherein the surface of the filler has been modified with functionalized compounds.

WO 01/96467 describes polyolefin nanocomposite materials comprising a graft copolymer. The preparation of the graft copolymer is carried out in the presence of an organoclay so that a significant improvement in the mechanical properties of the products is achieved. The polyolefin composite materials used for fibres up to now, however, failed to provide polyolefin fibres with the previously said balance of performances. The most serious problem presented by the prior art nanocomposite materials in fiber application is that they are spun with difficulty.

The present invention overcomes the disadvantages associated with the use of the above mentioned polyolefin nanocomposite materials in the production of fibres, by providing a polyolefin composite material having physical-chemical properties different from those of the composite material used up to now.

A great additional advantage of the polyolefin composite material of the present invention is that the said material exhibits good drawability with a very good spinning behavior.

It is also known the use of polyolefin composite materials for film production. The main draw back for these films is that they are particularly prone to breakages as in the European Patent n. 0659815 where the filler particles content is from 10 to 30% wt and have an average diameter ranging from about 0.5 to 40 μm. It is equally well known that the addition of a filler can produce voids that would increase permeability of the film if not filled with waxes as in the International Patent Application WO9903673. Thus the addition of a filler is expected to produce voids, brittleness and opaqueness of the film thereof.

When the filler is a nanosized filler it is expected to have the same effects. Particularly for bioriented films, it is still difficult to obtain a good dispersion of the nanosized filler avoiding the formation of gels or film breakages.

Films produced with the polyolefin composite material of the present invention surprisingly exhibits usual processing behavior, very good optical and physical-mechanical properties and improved barrier properties.

When adding a filler or a nanosized filler (nano-filler) such as a clay of the montmorillonite or bohemite families to a polyolefin composition a reduction in processability is expected due to an increase of the viscosity of the composition produced by the addition of the filler or nano-filler.

With the fillers of the present invention it was surprisingly found that the processability is improved versus similar filled or nano-filled materials. Shorter cycle time is possible at equal temperature or lower temperature of operation is possible for equal cycle time. This, can be correlated with a nucleating effect of the hydrotalcite in blend with polyolefins. In this respect, a further use is envisaged for of the hydrotalcite of the present invention as nucleating agent in blend with polyolefins in amounts from 0.02 to 1 parts by weight of polyolefin blend. It is known that nucleation centers, increasing the temperature at which the polymer crystallizes and solidifies, thereby reduce cycle time and increase productivity particularly for moulding applications. An higher Tc is measured with the addition of the hydrotalcite nano-filler of the present invention and higher Heat Deflection Temperature (HDT) is also observed linked with a better temperature resistance of the material. An increase of more than 5° C. is observed in presence of hydrotalcite in the amounts of the present invention. Thus, the hydrotalcite nano-filler of the present invention combines the advantage of a nucleating agent with that of a nano-filler which is desired for applications like medical sterilized items, food packaging in contact with hot water, industrial items exposed to temperatures up to 120° C.

It is known the use of hydrotalcite (basic aluminum magnesium carbonate) as a neutralization agent in polypropylene or polyethylene compositions as anti-acid neutralizing chlorine residues coming from Ziegler-Natta catalysts. The U.S. Pat. No. 6,270,209 discloses the neutralizing effect but remains silent on the nucleating effect. Indeed, the composition disclosed also comprise sorbitol derivatives as nucleating agent. The hydrotalcite is used in small amounts, specifically in the range of 0.005 to 1.5 weight percent of the polypropylene or polyethylene compositions. U.S. Pat. No. 4,611,024 discloses the use of hydrotalcites in polypropylene polymers as enhancer of the clarifying-nucleating effect of alditols (Millad). The hydrotalcite is used in a very small amount, specifically in the range of 0.01 to 0.5 weight percent, preferably about 0.02 to 0.15 weight percent based on the weight of the polymer. Hydrotalcites are also known in the art for use as inhibitor of ultraviolet thermal degradation of thermoplastic resins (other then olefinic) in Miyata et al U.S. Pat. No. 4,299,759 (Nov. 10, 1981). It is also known the use as conventional fillers in high amounts in polymer compositions such as and WO0190235.

WO03059917 (Sunoco) disclose the preparation of synthetic hydrotalcytes and their use for the preparation of blends with polyolefins and maleated polyolefin. The self-exfoliation of the hydrotalcite is obtained in a slurry further mixed and heated with the polymer to obtain dispersion of the hydrotalcite present in amounts of 3% or more in the slurry.

The international patent application WO 2006/131450 discloses the use of layered minerals, particularly of layer silicates, in nanofilled polyolefin with a valuable balance of properties. A drawback of the known materials is the organic pre-treatment of the nanosized filler that is required for obtaining exfoliation and nano-dispersion of the filler in the polymeric matrix that produces the desired properties of the nanocomposite. As a consequence of the organo-modification polymer nanocomposites based on organo-clay materials are not suitable for food contact.

There is a continuous demand of new polyolefin materials for fibers and films, sheets and thermoformed, blow molded and injection molded (IM) articles such as blisters and cups and closures and bottles, exhibiting improved balance of properties and further suitable for food contact.

Therefore, the present invention provides a polyolefin nanocomposite material comprising the following components:
(A) a crystalline or semi-crystalline polyolefin resin; and
(B) a nanosized mineral filler comprising or substantially consisting of a hydrotalcite,
wherein the amount of the hydrotalcite is from 0.02 to 6, preferably from 0.03 to 3, more preferably from 0.05 to 1 parts by weight per 100 parts by weight of the nanocomposite material, and the ratio MFR (1)/MFR (2) of the melt flow rate value MFR (1) of component (A) to the melt flow rate value MFR (2) of the polyolefin nanocomposite material is of at least 1.02, preferably from 1.02 to 1.5, characterized in that
the polyolefin nanocomposite material includes a compatibilizer, and
the dispersion of the mineral filler and compatibilizer in the polyolefin resin is produced at shear mixing rates from 30 to 300 sec$^{-1}$, preferably from 30 to 200 sec$^{-1}$; more preferably from 30 to 150 sec$^{-1}$ The composite material of the present invention typically exhibits the following properties:
an increase of the flexural elastic modulus of from at least 1 to 40%, preferably from 10% to 40% with respect to the value measured on component (A);
an increase of heat distortion temperature of from 5 to 25° C., preferably from 10 to 25° C., with respect to the value measured on component (A);
an increase of crystallization temperature (Tc) of from 1 to 15° C., preferably from 10 to 15° C., with respect to the value measured on component (A). Particularly, the Tc of the composition is higher than 115° C. when the component (A) is a polypropylene homopolymer;
an increase of Heat Distorsion Temperature (HDT) of at least 10° C., preferably at least 15° C. with respect to the value measured on component (A);
an increase of gas barrier properties of from at least 5 to 40%, preferably from 10 to 40% with respect to the value measured on component (A);
MFR(2) values of from 1 to 800 dg/min, preferably from 1.5 to 40 dg/min.

Component (A), namely the starting polyolefin resin matrix, is preferably a propylene polymer that is either a propylene homopolymer or an heterophasic copolymer or a random interpolymer of propylene with an α-olefin selected from ethylene and a linear or branched $C_4$-$C_8$ α-olefin, such as copolymers and terpolymers of propylene. Component (A) can also be a mixture of the said polymers, in which case the mixing ratios are not critical. Preferably, the α-olefin is selected from the group consisting of ethylene, 1-butene, 1-pentene, 1-hexene, 1-heptene, 1-octene, 1-nonene, 1-decene and 4-methyl-1-pentene. The preferred amount of comonomer content ranges from 0.5 to 15 wt %. The preferred polyolefin resin is propylene homopolymer.

The said propylene polymer exhibits a stereoregularity of the isotactic type. The percent by weight of polymer insoluble in xylene at ambient temperature is considered the isotactic index of the polymer. This value corresponds substantially to the isotactic index determined by extraction with boiling n-heptane, which by definition constitutes the isotactic index of polypropylene.

The isotactic index of component (A) (measured as above said) is preferably from 60 to 99%. Particularly, when component (A) is and Homopolymer or random copolymer of propylene the isotactic index is preferably from 80 to 99%. When the component (A) is an eterophasic copolymer of propylene the isotactic index is preferably from 60 to 85%. Component (A) can also be advantageously selected from polyethylene and polybutene-1. Particularly component (A) can be also a LDPE for films, blisters or closures.

When component (A) is polypropylene the crystalline or semi-crystalline polyolefin resin has an insolubility in xylene at ambient temperature, namely about 25° C., higher than 55 wt %. Component (A) has a melt flow rate value preferably of from 1 to 50 g/10 min. The polyolefin nanocomposite can also undergo chemical degradation with peroxides to increase the melt flow rate. When component (A) is polyethylene it has a melt flow rate value preferably of from 0.1 to 10 g/10 min. When component (A) is polybutene-1 it has a melt flow rate value preferably of from 0.2 to 50 g/10 min.

The melt flow rate (MFR) values are measured according to the appropriate ISO 1133 method, in particular according to ISO method 1133 at 230° C., 2.16 kg for propylene polymers, and according to ISO method 1133 at 190° C., 2.16 kg for butene-1 or ethylene polymers. The said polyolefin resin is prepared by polymerization of the relevant monomers in the presence of a suitable catalyst such as a highly stereospecific Ziegler-Natta catalyst or metallocene catalyst. In particular it can be obtained by low-pressure Ziegler-Natta polymerization for example with catalysts based on $TiCl_3$, or halogenated compounds of titanium (in particular $TiCl_4$) supported on magnesium chloride, and suitable co-catalysts (in particular alkyl compounds of aluminium).

Component (B), namely the layered nanosized mineral filler, is a hydrotalcite.
The general formula of hydrotalcites used in this patent is:

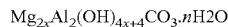

$$Mg_{2x}Al_2(OH)_{4x+4}CO_3 \cdot nH_2O$$

Were: x>0 and n>0

The hydrotalcite used for the preparation of the nanocomposite materials of the present invention generally comprise an organic component fraction that partially substitute $CO_3^{2-}$ or $OH^-$ anions on the superficial layers and also in internal layers.

When the hydrotalcite undergoes appropriate organic treatment the formula can be represented by:

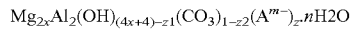

$$Mg_{2x}Al_2(OH)_{(4x+4)-z1}(CO_3)_{1-z2}(A^{m-})_z \cdot nH_2O$$

Were: x>0 and "(z)×(m)=z1+2 z2" and n>0 and A=organic anion having a valence of m.

The amount of organic component fraction can vary widely, and could be in the range from 0.5% to 45% by weight, preferably from 20% to 45% by weight and can be expressed in terms of anionic exchange capacity (AEC) ranging from 0.5 to 6 milliequivalents per gram. All the above-mentioned amounts related to the weight of the layered nanosized mineral filler are based on the dehydrated form.

The organic component fraction is the anionic part of an anionic tensioactive or more generally an organic anion of a Metal organic salt (MeA). MeA increases the interlayer distance between the different layers of the filler improving the hydrotalcite dispersion in the polymer matrix.

The organic anions can be selected from the families of conjugated bases of organic acids (HA). Examples, not exhaustive, of suitable organic acids are: carboxylic acids, fatty acids, sulfonic acids, phosphonic acids, and sulfate acids and it is possible to use also a combination of those anions.

Preferred are anions of organic substance approved for food contact in polymers like: Stearic acid, Erucic acid, Oleic acid, Palmitic acid, Laurilic acid, Benzoic acid, Rosin acid, Tartaric acid, Sebacic acid and Adipic acid anions.

The compatibilizer is added to better disperse the mineral filler into the polyolefin resin. Preferred compatibilizer are modified polyolefins such as polyolefin copolymers comprising polar monomers and polyolefins grafted with grafting agents comprising polar groups such as those disclosed in the patent EP 0747322 (Toyota). In the present invention the grafting agents are preferably selected from those containing at least one functional group selected from carboxylic groups and their derivatives, such as anhydrides. The aforesaid polar monomers with one or more functional groups are preferably selected in the group comprising: vinyl acetate, acrylic acid, butyl acrilate, metil meta acrilate, meta acrylic acid and olefinic polar monomers.

Particularly preferred as grafting agents are anhydrides of an unsaturated dicarboxylic acid, especially maleic anhydride, itaconic anhydride, citraconic anhydride and tetrahydrophthalic anhydride, fumaric anhydride, the corresponding acids and $C_1$-$C_{10}$ linear and branched dialkyl esters of said acids. Maleic anhydride is preferred. More particularly preferred are grafted copolymers where the backbone polymer chain is a polymer of an olefin selected from ethylene and/or $C_3$-$C_{10}$ α-olefins.

The backbone polymer chain of the modified polyolefin acting as a compatibilizer is preferably made up of olefin(s) monomers that can be same as or different from those of component (A).

The grafting agents are generally grafted on the backbone of the said polyolefin to be modified in amounts ranging from 0.4 to 1.5% by weight with respect to the total weight of the grafted polyolefin.

Comparable amounts of polar monomers in free form can also be present in addition.

An example of suitable graft copolymer is the polypropylene-g-maleic anhydride.

The polar monomers are present in the polymer chain of the modified polyolefin in amount from 5 to 25% wt with respect to the total weight of the modified polyolefin copolymer.

An example of suitable copolymer comprising polar monomers is an ethylene vinyl acetate copolymer (EVA).

The compatibilizer is preferably used in amounts ranging from 0.02 to 10% by weight, preferably from 0.05 to 7 wt %, more preferably from 0.05 to 2 wt % with respect to the weight of the nanocomposite.

In fiber application low contents of compatibilizer are preferred; in fact particularly good results are obtained with amounts of grafted polyolefin in the range from 0.1 and 1 wt %, particularly from 0.2 to 0.5 wt % with respect to the weight of the nanocomposite.

Further components present in the polyolefin nanocomposite material of the present invention are additives commonly employed in the art, such as antioxidants, anti-acids, light stabilizers, heat stabilizers, antistatic agents, flame retardants, fillers, clays, nucleating agents, pigments, anti-soiling agents, photosensitizers.

A further embodiment of the present invention is a process for the preparation of the said polyolefin nanocomposite material.

The polyolefin nanocomposite material according to the present invention is prepared by mechanically blending polyolefin component (A), component (B) and the compatibilizer and optionally further components. The nano-filler component (B) can be blended in pure (undiluted) form with the polyolefin component (A) in the presence of a compatibilizer (one step process) or, preferably, as part of an intercalated masterbatch (two step process); in such a case, component (B) is previously dispersed in a polymer resin (A'), that can be same as or different from polyolefin component (A), in presence of the compatibilizer. The masterbatch thus prepared is then blended with the polymer component (A). The nanocomposite composition according to the present invention can be prepared by a melt mixing process using conventional equipments, such as an extruder, like a Buss extruder, or a single or a twin screw extruder with length/diameter ratio from 18 or more, preferred from 18 to 40, or a mixer, like a Banbury mixer. Preferred extruders are equipped with screws able to generate low values of shear stress. Particularly with such extruders lower values of the length/diameter ratio are not excluded; in fact particularly good results are obtainable already with length/diameter ratio from 15 or more.

The two step process of producing the polyolefin nanocomposite material according to the present invention comprises at least the two following steps:

1) preparing an intercalated (partially exfoliated) masterbatch by mixing a polyolefin resin (A') that can be the same as component (A) or different, with a mineral filler (B) in presence of a compatibilizer; and 2) mixing the intercalated masterbatch prepared in step (1) with the polyolefin resin component (A).

The nanosized filler is preferably added to the polyolefin resin when it is in the molten state. In an extruder the mineral filler is added with a feeder positioned after the melting of the polymer.

The above-mentioned other additives can be added, in a two step process, during either step (1), step (2) or both. The compatibilizer is added during step (1) before adding the mineral filler (B). Preferably the compatibilizer and other additives are added in step (1) to the polyolefin resin when it is still in the solid state.

The said process uniformly disperses the mineral filler in the polyolefin matrix and leads to nanocomposites having a high degree of exfoliation of the mineral filler (B).

The amount of layered nanosized mineral filler in dehydrated form is preferably from 2 to 40% by weight, more preferably from 2 to 26% by weight with respect to the total weight of the masterbatch. The compatibilizer is present in amounts preferably from 2 to 40% by weight, more preferably from 2 to 26% by weight with respect to the total weight of the masterbatch obtained in step (1). The intercalated masterbatch typically exhibit an increase of flexural elastic modulus of from 10 to 100% with respect to the starting polyolefin resin Preferred as pre-exfoliating polyolefin resin (A') for the preparation of the intercalated (partially exfoliated) masterbatch in step 1 is a butene-1 polymer having a melt flow rate value preferably of from 0.2 to 50 g/10 min (190/2.16, ISO1133) preferably of from (3 to 20 g/10 min), and a melting temperature of from 90 to 130° C. preferably of from (110 to 128° C.). Preferred butene-1 polymers for the preparation of the masterbatch in step 1 are homo or copolymers of butene-1 with one or more α-olefins as comonomers selected from ethylene, propylene and a linear or branched C5-C8 α-olefin. Preferably, the α-olefin comonomer is selected from the group consisting of ethylene, propylene, 1-pentene, 1-hexene, 1-heptene, 1-octene, 1-nonene, 1-decene and 4-methyl-1-pentene. The preferred amount of comonomer content in the butene-1 copolymer ranges from 0.5 to 15 wt %. Particularly preferred polyolefin resin (A') is a butene-1 homopolymer.

The above said process steps (1) and (2) are preferably carried out under the following conditions:
   shear mixing rate ranging from 30 to 300 sec$^{-1}$, preferably from 30 to 150 sec$^{-1}$;
   a mixing temperature higher than the polymer softening temperature, in particular of at least 180° C., preferably from 180 to 250° C.;
   residence time in mixing machine over 80 sec.

Uniform dispersion of the nanosized filler with a high degree of exfoliation of the said filler in the polyolefin matrix can be obtained also with a one step process.

The one step process comprises the addition of the undiluted mineral filler component (B) directly on the molten polyolefin resin component (A). The compatibilizer and the other additives, that can be optionally added, are preferably added to component (A) before the said step of addition of the layered mineral filler component (B), when the polyolefin component (A) is still in the solid state.

The addition of the nano-filler on the molten polymer, both in the one step and in the two step process, prevents deterioration of the aspect ratio of the filler platelets.

The same preferred extrusion conditions, reported for the two step process above, are indicated also for the one step process.

Another embodiment of the present invention is a fibre made from the above mentioned polyolefin nanocomposite material, thus comprising or substantially consisting of the said material. The amount of layered nanosized mineral filler in the polyolefin nanocomposite material for fibers is preferably from 0.05 to 2% by weight, more preferably from 0.1 to 1% by weight, even more preferably from 0.2 to 0.5% by weight of the nanosized mineral filler in dehydrated form, with respect to the total weight of the nanocomposite material. Polyolefin nanocomposite material for fibers are produced preferably with the two step process. Fibers produced with the nanocomposite material of the present invention can be produced by any conventional process included bulk continuous filament and Spunbond non woven. Thus, another further embodiment of the present invention is a non-woven fabric comprising the previously said fibres.

The unstretched filaments (fiber) according to the present invention typically exhibit the following balance of properties: a tenacity value higher than 22 cN/tex and an elongation at break value higher than 200%.

The polyolefin material used for the production of nanocomposite materials for fibers has a $\overline{M}_w/\overline{M}_n$ value, measured by GPC, typically ranging from 2 to 10, and MFR ranging from 8 to 800 g/10 min, A still further embodiment of the present invention is a film, bioriented, blown or cast made from the above mentioned polyolefin nanocomposite material, thus comprising or substantially consisting of the said material.

Particularly preferred are BOPP films and polyethylene blown films that when produced according to the present invention typically exhibits improved barrier properties with respect to gases such as $O_2$, $CO_2$ and water vapour. Particularly an improvement of $O_2$ barrier activity of at least 20% is observed with PP homopolymers with respect to the reference material without nanosized filler.

Instead, with films produced with LDPE nanocomposite, barrier improvements from 5 to 15% are observed.

Stretchability of the films according to the invention does not get worse for the addition of the nanosized hydrotalcite with respect to the reference material at the temperature of the stretching process. Also the optical properties, particularly Haze and Gloss, do not get worse for the addition of the nanosized hydrotalcite with respect to the reference material.

The polyolefin material used for the production of nanocomposite materials for BOPP processes typically has a $\overline{M}_w/\overline{M}_n$ value from 4 to 8, and an MFR value from 1.5 to 5 g/10 min. The amount of nano-filler component (B) in nanocomposites for BOPP application according to the invention is typically from 0.5 to 3% by weight of nanosized mineral filler in dehydrated form, with respect to the total weight of the nanocomposite material. The amount of nano-filler component (B) in nanocomposites for LDPE film application according to the invention is typically from 0.3 to 6% by weight of nanosized mineral filler in dehydrated form, with respect to the total weight of the nanocomposite material.

A still further embodiment of the present invention is a pipe, made from the above mentioned polyolefin nanocomposite material, thus comprising or substantially consisting of the said material. The polyolefin material used for the production of nanocomposite materials for pipe typically a polybutene-1 homopolymer or copolymers of butene-1 an at least one other alfa-olefin. When the polyolefin material is a copolymer of butene-1 with ethylene, typically the amount of ethylene comonomer is from 0.3 to 2% wt preferably from 0.5 to 1% with respect to the weight of the copolymer. The amount of nanosized mineral filler component (B) in nanocomposites for pipe application according to the invention is typically from 0.1 to 1.5, preferably from 0.2 to 1.2% by weight of nanosized mineral filler in dehydrated form, with respect to the total weight of the nanocomposite material. The improvement of physical-mechanical properties exhibited by the nanocomposite, particularly the improvement of Flexural Modulus brings to improvement of creep resistance and the possibility of down gauging the use of material e.g. the thickness of the pipe can be reduced without compromising performance.

Another further embodiment of the present invention is a Polyethylene film or a sheet for thermoformed blisters or an injection molded article for cups and closures applications and blown bottles.

The particulars are given in the following examples, which are given to illustrate, without limiting, the present invention.

The following analytical methods have been used to determine the properties reported in the detailed description and in the examples.

Melt Flow Rate (MFR): According to ISO method 1133 (230° C., 2.16 kg, for polypropylene) if not differently specified.

Fractions soluble and insoluble in xylene at 25° C.: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble at room temperature.

Flexural elastic modulus: According to ISO 178.
Density: According to ISO 1183.
Heat Distortion Temperature (HDT): According to ISO 75.
Tensile properties (Tensional Elastic Modulus, Stress at Break, Elongation at Break, Stress at Yield, Elongation at Yield): According to ISO 527-1,-2.
Crystallization Temperature Tc: according to ISO 11357, via DSC (2nd run at 20° C./min cooling)
Titre of filaments: from a 10 cm long roving, 50 fibres are randomly chosen and weighed. The total weight of the said 50 fibres, expressed in mg, is multiplied by 2, thereby obtaining the titre in dtex.
Tenacity and Elongation (at break) of filaments: from a 500 m roving a 100 mm long segment is cut. From this segment the single fibres to be tested are randomly chosen. Each single fibre to be tested is fixed to the clamps of an Instron dynamometer (model 1122) and tensioned to break with a traction speed of 20 mm/min for elongations lower than 100% and 50 mm/min for elongations greater than 100%, the initial distance between the clamps being of 20 mm. The ultimate strength (load at break) and the elongation at break are determined.
The tenacity is derived using the following equation:

Tenacity=Ultimate strength (cN)10/Titre (dtex).

Film Haze: According to ASTM D-1003.
Film Gloss According to ISO 2813.
Film Permeability (gas transmission rate): According to ASTM D1434-82 (2003).

EXAMPLE 1 AND COMPARATIVE EXAMPLE 1 (1C)

In a monoscrew Buss 70 extruder having a length/diameter ratio of 17 a blend (intercalated masterbatch) was prepared by mixing the following components:

1) 95 wt % of a polyolefin matrix consisting of an isotactic propylene homopolymer (MFR 12) produced by polymerizing propylene in the presence of a Ziegler-Natta catalyst, having a solubility in xylene at 25° C. of about 3% wt;
2) 2.5 wt % of an organo-hydrotalcite (component (B)) marketed with the trademark PERKALITE F100 by AKZO NOBEL, containing a saturated fatty acid as modifier; and
3) 2.5 wt % of a maleic anhydride-g-polypropylene (compatibilizer) having 0.7 wt % of maleic anhydride grafted on the polypropylene.

The extrusion was carried out adding component 3 to component 1 when it is still in the solid state and component (2) to the melt of component (1) and (3) in the extruder under the following conditions:

extrusion temperature: 220° C.;
residence time in the extruder: 1.5 min;
shear mixing: 100 sec$^{-1}$.

The comparative example 1 (1c) is the reference material (polyolefin matrix (1)) without filler and compatibilizer.

Table 1 reports the amounts of component 1 and 2 and of the filler and compatibilizer in the final polyolefin nanocomposite materials, and the properties of the materials determined on injection molded samples prepared according to ISO 294.

TABLE 1

|  | Examples | |
| --- | --- | --- |
|  | 1C | 1 |
| Polyolefin homopolymer-component (A), wt % | 100 | 95 |
| Mineral filler, wt %*—component (B) |  | 2.5 |
| Compatibilizer, wt % |  | 2.5 |
| MFR of polyolefin component (A) (MFR (1)) dg/min | 13 |  |
| MFR of polyolefin nanocomposite material (MFR (2)), dg/min |  | 10.4 |
| MFR (1)/MFR (2) ratio | — | 1.25 |
| Properties of the nanocomposite material | | |
| Flexural elastic modulus, MPa | 1340 | 1493 |
| Density, g/ml | 0.905 | 0.915 |
| Heat Distortion Temperature, ° C. (0.46 N/mm$^2$) | 89 | 100 |
| Elongation at break*, % | >200 | >200 |
| Tc (via DSC 2$^{nd}$ run 20° C./min cooling) | 109 | 116 |
| Tensional elastic modulus, MPa | 1335 | 1520 |
| stress at yield, MPa | 33.2 | 34.1 |
| elongation at yield, % | 11 | 9 |
| stress at break, MPa | 19.3 | 20.4 |
| IZOD notched at 23° C., kJ/m$^2$ | 3.3 | 3.4 |

*Elongation at break measured with a dynamometer having maximum extension of 200%

EXAMPLE 2-4 AND COMPARATIVE EXAMPLE 2 (2C)—FIBERS

Step (1): Preparation of the Masterbatch

The blend prepared in example 1 was used as masterbatch in these examples.

Step (2) Preparation of the Polyolefin Nanocomposite Material

In the same type of extruder as that used in example (1) polyolefin nanocomposite materials were prepared by mixing in different amounts the following components:

1) an isotactic propylene homopolymer (MFR 28.4) (component (A)) produced by polymerizing propylene in the presence of a Ziegler-Natta catalyst, having a solubility in xylene at 25° C. of about 3% wt and containing Irganox B215 conventional stabilizer formulation for fibers commercialized by CIBA; and 2) the blend prepared in example 1.

The extrusion took place under the same conditions as for example (1).

Preparation of the Fibres

The polyolefin nanocomposite material thus obtained was spun in a Leonard pilot plant to prepare continuous fibres. The spinning process was carried out at a temperature of 280° C. and at a spinning rate of 1500 m/min and constant out-put of 0.4 grams/min·hole. Then the fibre was stretched at a stretching ratio of 1:15, for a final take up speed of 2250 m/min. The maximum spinnability speed was 3900 m/min.

The comparative example 2 (2c) is the reference material (component (A)) without filler and compatibilizer processed as the other samples.

Table 2 reports the amounts of component 1 and 2 and of the filler and compatibilizer in the final polyolefin nanocomposite materials, and the properties of the materials as such and those of fibres produced with the polyolefin nanocomposite materials.

xylene at 25° C. of about 4% wt and containing a conventional stabilizer formulation and having a MFR of 1.9 (dg/min);

2) an hydrotalcite (component (B)); and 3) a maleic anhydride-g-polypropylene (compatibilizer) having 0.7 wt % of maleic anhydride grafted on the polypropylene.

The masterbatch a was prepared with an hydrotalcite marketed with the tradename Perkalite F100 by Akzo (F100).

The masterbatches b and c were prepared with a different commercial hydrotalcite marketed with the tradename Perkalite P100S by Akzo (P100S). Perkalite P100S has a higher organic treatment than Perkalite F100. The grafted PP compatibilizer was not added to the masterbatch b.

The extrusion of the masterbatches was carried out under the following conditions:
  extrusion temperature: 230° C.;
  residence time in the extruder: 2 min;
  shear mixing: 130 sec$^{-1}$.

Table 3a reports the amounts of component 1, 2 and 3 in the masterbatches.

TABLE 2

| | Examples | | | |
|---|---|---|---|---|
| | 2C | 2 | 3 | 4 |
| Process Step (2) | | | | |
| Polyolefin homopolymer-component (A), pw | 100 | 98 | 96 | 88 |
| Masterbatch-blend of example 1, pw | | 2 | 4 | 12 |
| Final polyolefin nanocomposite material | | | | |
| Mineral filler, wt %* | | 0.05 | 0.1 | 0.3 |
| Compatibilizer, wt % | | 0.05 | 0.1 | 0.3 |
| MFR of polyolefin component (A) (MFR (1)) dg/min | 28.4 | | | |
| MFR of polyolefin nanocomposite material (MFR (2)), dg/min | | 27.4 | 27.1 | 26.5 |
| MFR (1)/MFR (2) ratio | — | 1.04 | 1.05 | 1.09 |
| Properties of the nanocomposite material on IM plaques | | | | |
| Flexural elastic modulus, MPa | 1360 | 1410 | 1450 | 1540 |
| Density, g/ml | 0.905 | 0.906 | 0.907 | 0.908 |
| Heat Distortion Temperature (0.45 MPa), ° C. | 88 | 92 | 97 | 99 |
| Elongation at break, % | 200 | 250 | 310 | 370 |
| Spinning Process | | | | |
| Head Temperature ° C. | 280 | 280 | 280 | 280 |
| spinning rate m/min | 1500 | 1500 | 1500 | 1500 |
| Stretching ratio | 1:1.5 | 1:1.5 | 1:1.5 | 1:1.5 |
| Properties of fibres | | | | |
| maximum spinnability speed m/min | 3900 | 3900 | 3900 | 3900 |
| Titer, dtex | 2.3 | 2.2 | 2.15 | 2.15 |
| Tenacity, cN/tex | 23 | 26 | 25 | 23 |
| Elongation at break, % | 180 | 220 | 215 | 210 |

*The values of Mineral filler, wt % are calculated with respect to the final nanocomposite material weight and considering the inorganic plus the organic component fractions of the mineral filler.

EXAMPLE 5-7 AND COMPARATIVE EXAMPLE 5 (5C)—BOPP FILMS

Step (1): Preparation of the Masterbatch

In a twin-screw extruder having a length/diameter ratio of 27 a masterbatch was prepared by mixing the following components:

1) a polyolefin matrix consisting in an isotactic propylene homopolymer produced by polymerizing propylene in the presence of a Ziegler-Natta catalyst, having a solubility in TABLE 3a

| | Masterbatch | | |
|---|---|---|---|
| | a | b | c |
| Polyolefin homopolymer, pw | 65 | 75 | 65 |
| Mineral filler, wt % F100 | 25 | | |
| *—component (B) P100S | | 25 | 25 |
| Compatibilizer, wt % | 10 | 0 | 10 |

Step (2) Preparation of the Polyolefin Nanocomposite Material

After the preparation of the masterbatch, in the same type of extruder as that used in step (1), a polyolefin nanocomposite material was prepared by mixing the following components:
1) 90 parts by weight (pw) of an isotactic propylene homopolymer (component (A)) of the same type as that used for the matrix in the masterbatch; and
2) 10 parts by weight of the masterbatch previously prepared.

The extrusion took place under the same conditions as for step (1).

Preparation of the BOPP Film

The polyolefin nanocomposite material thus obtained were compression moulded on a CARVER machine at 200° C. to obtain a plaque 1 mm thick and 60×60 mm and then have been stretched using TM-Long machine at an oven temperature of 150° C. with a stretching ratio of 7×7 in both directions to obtain a BOPP film 21-23 μm thick The comparative example 5 (5c) is the reference material (component (A)) without filler and compatibilizer processed as the other samples.

Table 3b reports the amounts of component 1) and 2) the type and amount of nano-filler and compatibilizer in the final polyolefin nanocomposite material and the properties of the BOPP film produced with the polyolefin nanocomposite material and comparative reference material.

EXAMPLE 8-10 AND COMPARATIVE EXAMPLES 8 AND 10 (8C-10C)—INJECTION MOULDING

Step (1): Preparation of the Masterbatch

In a twin-screw extruder having a length/diameter ratio of 27 a masterbatch was prepared by mixing the following components:
1) 52 wt % of a polyolefin matrix consisting in an isotactic propylene homopolymer (MFR 12) produced by polymerizing propylene in the presence of a Ziegler-Natta catalyst, having a solubility in xylene at 25° C. of about 3.5% wt and containing a conventional stabilizer formulation for injection moulding.
2) 20 wt % of an Hydrotalcite marketed with the trademark Pural MG 63 HT by Sasol (MG63HT), containing 2% by weight of organic component (carboxylic fatty acid); and
3) 28 wt % of a maleic anhydride-g-polypropylene having 0.7 wt % of maleic anhydride grafted on the polypropylene.

The extrusion was carried out under the same conditions of example 1:
extrusion temperature: 230° C.;
residence time in the extruder: 1.5 min;
shear mixing: 100 sec-1.

Step (2) Preparation of the Polyolefin Nanocomposite Material

After the preparation of the masterbatch, in the same type of extruder as that used in process step (1) a polyolefin nanocomposite material was prepared by mixing the following components:

TABLE 3b

|  | Examples | | | |
| --- | --- | --- | --- | --- |
|  | 5c | 5 | 6 | 7 |
| Process Step (2) | | | | |
| Polyolefin homopolymer - component (A), pw | 100 | 90 | 90 | 90 |
| Masterbatch a, pw | — | 10 | | |
| Masterbatch b, pw | | | 10 | |
| Masterbatch c, pw | | | | 10 |
| Final polyolefin nanocomposite material | | | | |
| Mineral filler, wt %* | 0 | 2.5 | 2.5 | 2.5 |
| Mineral filler Type | — | F100 | P100S | P100S |
| Compatibilizer, wt % | 0 | 1 | 0 | 1 |
| MFR of Polyolefin homopolymer (1) (MFR (1)) dg/min (on pellet) | 1.9 | | | |
| MFR of polyolefin nanocomposite material (MFR (2)), dg/min (on pellet) | — | 1.5 | 1.4 | 1.6 |
| MFR (1)/MFR (2) ratio (on pellet) | | 1.3 | 1.4 | 1.2 |
| Stretching Process | | | | |
| Temperature ° C. | 150 | 150 | 150 | 150 |
| Properties of the BOPP film | | | | |
| Thickness, μm | 22 | 22 | 19 | 23 |
| Haze % | 0.6 | 1.4 | 0.6 | 0.6 |
| Gloss 60° % | 93 | 91.3 | 93 | 93 |
| Tensional Elastic Modulus, MPa | 2370 | 2470 | 2500 | 2200 |
| Elongation at Break, % | 27 | 15 | 31 | 33 |
| Gas Barrier Properties of the BOPP film | | | | |
| film thickness, μm | 22 | 22 | 19 | 23 |
| $O_2$ Transmission Rate, $cc/m^2$ 24 h (T = 25° C., RH = 0%) | 1942 | 1362 | 1504 | 1442 |
| OTR Normalized at 20 μ, $cc/m^2$ 24 h | 1765 | 1238 | 1583 | 1254 |
| Barrier improvement vs. Ref. 5c % | — | 29.9 | 17.4 | 29.0 |

*The values of Mineral filler, wt % are calculated with respect to the final nanocomposite material weight and considering the inorganic plus the organic component fractions of the mineral filler.

1) 95 wt % of the same isotactic propylene homopolymer (MFR 12) used in step (1) produced by polymerizing propylene in the presence of a Ziegler-Natta catalyst, having a solubility in xylene at 25° C. of about 3.5% wt and containing a conventional stabilizer formulation for injection moulding. (component (A))

2) 5 wt % of the masterbatch previously prepared in step (1) of this example.

The extrusion took place under the same conditions as for step (1).

The comparative example 8 (8c) is the reference material (component (A)) without filler and compatibilizer processed as the other samples.

The comparative Example 10 (10C) is prepared for comparison using a different nano-filler: Cloisite 15A by Southern Clay Products (C15A), containing 43% by weight of organic component (organic ammonium salt). The sample was prepared with the same procedure of Example 10 and amounts of fillers and compatibilizers as summarized in table 4;

Table 4 reports the amounts of filler and compatibilizer in the final polyolefin nanocomposite material for the examples 8-10 and comparative example 8c and 10c together with the properties measured on injection molded plaques (prepared according to ISO 294).

catalyst, having a solubility in xylene at 25° C. of about 3.5% wt and containing a conventional stabilizer formulation for injection moulding.

2) 5% wt % of an hydrotalcite marketed with the tradename Pural MG 61 HT MC by Sasol, containing 15% by weight of organic component (stearic acid); and 3) 7 wt % of a copolymer of ethylene with acrylic acid and buthyl acrilate (EBA) compatibilizer, having 4 wt % of acrylic acid and 7 wt % of buthyl acrilate copolymerized with polyethylene.

The extrusion was carried out under the following conditions:
extrusion temperature: 240° C.;
residence time in the extruder: 2 min;
shear mixing: 150 sec$^{-1}$.

Reference examples 11b and 11c were prepared with same procedure and amount of fillers and compatibilizer as specified in table 5

EXAMPLE 12, AND COMPARATIVE EXAMPLE 12C

Example 12 with same procedure of example 11 using hydrotalcite Perkalite P1005 from Akzo (PS100) as nanofiller.

TABLE 4

|  | Examples | | | | |
| --- | --- | --- | --- | --- | --- |
|  | 8c | 8 | 9 | 10 | 10c |
| Process Step (2) | | | | | |
| Polyolefin homopolymer - component (A), pw | 100 | 95 | 85 | 75 | 75 |
| Masterbatch, pw | 0 | 5 | 15 | 25 | 25 |
| Final polyolefin nanocomposite material | | | | | |
| Mineral filler Type | — | MG63HT | MG63HT | MG63HT | C15A |
| Mineral filler, wt %* | 0 | 1 | 3 | 5 | 5 |
| Compatibilizer, wt % | | 1.4 | 4.2 | 7 | 7 |
| MFR of polyolefin component (A) (MFR (1)) dg/min (on pellets) | 11.5 | | | | |
| MFR of polyolefin nanocomposite material (MFR (2)), dg/min (on pellets) | | 10.0 | 9.8 | 9.6 | 7.2 |
| MFR (1)/MFR (2) ratio (on pellets) | | 1.15 | 1.17 | 1.20 | 1.60 |
| Characterization of Injection molded specimens (plaques prepared according to ISO 294) | | | | | |
| Flexural Modulus, MPa | 1410 | 1729 | 1705 | 1671 | 2064 |
| Stress at Yield, MPa | 33.3 | 34.9 | 34.4 | 34.0 | 33.9 |
| Elongation at Yield, % | 11.0 | 7.6 | 9.4 | 9.6 | 8.4 |
| Stress at Break, MPa | >24 | 20.6 | >24 | >24 | 18.6 |
| Elongation at Break, % | >250 | 180 | >250 | >250 | 59 |
| H.D.T 0.46 N/mm$^2$, ° C. | 90.5 | 110.1 | 111.9 | 112.4 | 108.5 |
| IZOD notched, 23° C., kJ/m$^2$ | 3.4 | 3.7 | 3.6 | 3.6 | 3.4 |

*The values of Mineral filler, wt % are calculated with respect to the final nanocomposite material weight and considering the inorganic plus the organic component fractions of the mineral filler.

EXAMPLE 11 AND COMPARATIVE EXAMPLES 11B, 11C—INJECTION MOULDING

One Step Process:

In a twin-screw extruder having a length/diameter ratio of 27 a nanocomposite material (sample 11, Table 5) was prepared by mixing the following components:

1) 88 parts by weight (pw) of an isotactic propylene homopolymer (MFR 12) (component (A)) produced by polymerizing propylene in the presence of a Ziegler-Natta The comparative Example 12 (12c) is prepared for comparison using a different nano-filler: Cloisite 15A by Southern Clay Products (C15A), containing 43% by weight of organic component (organic ammonium salt). The sample was prepared with the same procedure of Example 12 and amounts of fillers and compatibilizers as summarized in table 5. Table 5 reports the amounts of filler and compatibilizer in the final polyolefin nanocomposite material for the examples 11-12 and comparative examples 11b, 11c and 12c together with the properties measured on injection molded plaques (prepared according to ISO 294).

TABLE 5

| | Examples | | | | |
|---|---|---|---|---|---|
| | 11b | 11c | 11 | 12 | 12c |
| Final polyolefin nanocomposite material | | | | | |
| Polyolefin homopolymer - component (A), pw | 100 | 93 | 88 | 88 | 88 |
| Mineral filler Type | — | — | MG61 HTMC | P100S | C15A |
| Mineral filler, wt %* | 0 | 0 | 5 | 5 | 5 |
| Compatibilizer, wt % | 0 | 7 | 7 | 7 | 7 |
| MFR of polyolefin component (A) (MFR (1)) dg/min (on pellets) | 12 | 12 | 12 | 12 | 12 |
| MFR of polyolefin nanocomposite material (MFR (2)), dg/min (on pellets) | | 13 | 10 | 9.2 | 7.5 |
| MFR (1)/MFR (2) ratio (on pellets) | | 0.92 | 1.2 | 1.3 | 1.6 |
| Characterization of Injection molded specimens | | | | | |
| Flexural Elastic Modulus, MPa | 1350 | 1414 | 1634 | 1640 | 1948 |
| Stress at Yield, MPa | 33.1 | 34.1 | 35.1 | 34.5 | 37.7 |
| Elongation at Yield, % | 11.1 | 9.7 | 8.6 | 8.0 | 8.3 |
| Stress at Break, MPa | 21.2 | 21.2 | 26.5 | 39.1 | 28.4 |
| Elongation at Break, % | 750 | 825 | 62 | 64 | 26 |
| H.D.T 0.46 N/mm$^2$, ° C. | 92 | 92 | 111 | 110 | 106 |
| Tc (via DSC $2^{nd}$ run 20° C./min cooling) | 107 | 108 | 121 | 120 | 110 |

*The values of Mineral filler, wt % are calculated with respect to the final nanocomposite material weight and considering the inorganic plus the organic component fractions of the mineral filler.

EXAMPLE 13 AND COMPARATIVE EXAMPLE 13 (13C)—LDPE FILM

One Step Process:

In a twin-screw extruder having a length/diameter ratio of 27 a nanocomposite material was prepared by mixing the following components:
1) 98.9 wt % of a polyolefin matrix consisting in a Low density PE (LDPE) produced by high-pressure tubular reactor process (Lupotech T process technology) described in the patent n. EP449092 or EP121756, having a density 0.930 g/cm3 (ISO 1183) and a MFR 0.55 (190° C./2.16 Kg, ISO 1133).
2) 0.5% wt % of an organoclay marketed with the trademark hydrotalcite Perkalite F100 from Akzo; and
3) 0.5 wt % of a EVA copolymer of ethylene with vinyl acetate having 12 wt % of vinyl acetate copolymerized with polyethylene and MFR/E 2.5 (190° C., 2.16 Kg) and density of 0.930 g/cm3 (commercialized under the name Elvax 3130 by Du Pont).
4) 0.1 of Irganox B215 as conventional stabilizer The extrusion was carried out under the following conditions:
 extrusion temperature: 200° C.;
 residence time in the extruder: 2 min;
 shear mixing: 150 sec$^{-1}$.

The comparative example 13 (13c) is the reference material (LDPE) without filler and compatibilizer processed as the other samples with a conventional stabilizer.

EXAMPLE 14-16 LDPE FILM

Example 13 was repeated except for the amounts of hydrotalcite and EVA that were changed as reported in Table 6.

Preparation of the LDPE Films

The polyolefin nanocomposite material thus obtained in examples 13-16 and comparative 13c, were processed with a monoscrew extruder 55 mm width and with a length/diameter (L/D) ratio of 30. The machine was set up to obtain a 500 μm thick blown film at a machine melt temperature of 220° C. and a blown up ratio of 1:3 with air temperature of 22° C.:

Table 6 reports the amounts of component 1) and 2) 3) in the final polyolefin nanocomposite material and the properties of the film produced with the polyolefin nanocomposite material for the examples 13-16 and comparative reference material of example 13c together with the properties measured on injection molded plaques (prepared according to ISO 294) and properties of the final LDPE films.

TABLE 6

| | Examples | | | | |
|---|---|---|---|---|---|
| | 13c | 13 | 14 | 15 | 16 |
| One step process | | | | | |
| Polyethylene low density component (A), pw | 99.9 | 98.9 | 97.9 | 92.9 | 89.9 |
| Mineral filler, wt %* | 0 | 0.5 | 1.0 | 3.5 | 5.0 |
| Compatibilizer, EVA, wt % | 0 | 0.5 | 1.0 | 3.5 | 5.0 |
| Irganox B215, wt % | 0.1 | 0.1 | 0.1 | 0.1 | 0.1 |
| MFR of polyolefin component (A) (MFR (1)) dg/min (on pellets) | 0.55 | 0.55 | 0.55 | 0.55 | 0.55 |

TABLE 6-continued

|  | Examples | | | | |
| --- | --- | --- | --- | --- | --- |
|  | 13c | 13 | 14 | 15 | 16 |
| MFR of polyolefin nanocomposite material (MFR (2)), dg/min (on pellets) |  | 0.51 | 0.51 | 0.53 | 0.54 |
| MFR (1)/MFR (2) ratio (on pellets) |  | 1.08 | 1.08 | 1.04 | 1.02 |
| Characterization of compression molded specimens | | | | | |
| Tensile Modulus at 23° C., MPa | 365 | 375 | 400 | 410 | 422 |
| Tensile Modulus at 60° C., MPa | 152 | 156 | 157 | 160 | 163 |
| Stress at Yield, MPa | 13.3 | 12.9 | 13.7 | 13.5 | 12.1 |
| Elongation at Yield, % | 12.3 | 12.8 | 12.7 | 11.7 | 11 |
| Stress at Break, MPa | 13.6 | 10.7 | 11.3 | 11.0 | 12.0 |
| Elongation at Break, % | 510 | 460 | 485 | 26 | 10 |
| Charpy notched 23° C., kJ/m$^2$ | 76 | 59 | 17 | 10 | 8 |
| Charpy notched −20° C., kJ/m$^2$ | 8.3 | 6.3 | 4.6 | 4.2 | 3.5 |
| Melting Temperature via DSC, ° C. | 117.1 | 117.3 | 117.6 | 117.7 | 118.0 |
| Tc —Crystallization Temp. via DSC, ° C. | 102.0 | 103.3 | 103.5 | 103.5 | 104.3 |
| Gas Barrier Properties of the film | | | | | |
| O$_2$ Transmission Rate on 500 μm film, (T = 25° C., RH = 0%) cc/m$^2$ · day | 235 | 223 | 217 | 214 | 210 |
| Barrier improvement vs. Ref. 13c, % | — | 5.1 | 7.7 | 8.9 | 10.6 |

*The values of Mineral filler, wt % are calculated with respect to the final nanocomposite material weight and considering the inorganic plus the organic component fractions of the mineral filler.

EXAMPLE 17 AND COMPARATIVE EXAMPLE 17C—PIPES

One Step Process:

In a mono-screw Buss 70 extruder having a length/diameter ratio of 17 a nanocomposite material was prepared by mixing the following components:

1) 99.35 wt % of a polyolefin matrix consisting in a Polybutene (PB-1) produced by liquid monomer solution process (Bulk solution technology) described in the International Patent Application WO2004/000895, having a density 0.914 g/cm3 (ISO 1183) and a MFR 0.4 (190° C./2.16 Kg, ISO 1133), commonly used for pipes applications.

2) 0.25% wt % of an organoclay marketed with the trademark hydrotalcite Perkalite F100 from Akzo; and 3) 0.25 wt % of a maleic anhydride-g-polypropylene (compatibilizer) having 0.7 wt % of maleic anhydride grafted on the polypropylene and MFR/L 120 (230° C., 2.16 Kg) density 0.930 g/cm3 (commercialized under the name Polybond 3200 by Crompton).

4) 0.15 of Irganox B215 as conventional stabilizer

The extrusion was carried out under the following conditions:

extrusion temperature: 230° C.;
residence time in the extruder: 90 sec.
shear mixing: 130 sec$^{-1}$.

The comparative example 17c is the reference material (1) without filler and compatibilizer processed as the other samples with a conventional stabilizer Irganox B215.

EXAMPLE 18-19-20—PB-1 PIPES

Examples 17 was repeated except for the amounts of hydrotalcite and MA-g-PP that were changed as reported in Table 7

Example 20 is equivalent to 18 without compatibilizer.

TABLE 7

|  | Examples | | | | |
| --- | --- | --- | --- | --- | --- |
|  | 17c | 17 | 18 | 19 | 20 |
| One Step Process | | | | | |
| Polybutene polymer - component (A), pw | 100 | 95 | 85 | 75 | 75 |
| Mineral filler Type | — | F-100 | F-100 | F-100 | F-100 |
| Mineral filler, wt %* | 0 | 0.25 | 0.5 | 1.0 | 0.5 |
| Compatibilizer, wt % | — | 0.25 | 0.5 | 1.0 | 0 |
| MFR of polyolefin component (A) (MFR (1)) dg/min (on pellets)(*) | 0.42 | | | | |
| MFR of polyolefin nanocomposite material (MFR (2)), dg/min (on pellets)(*) |  | 0.35 | 0.32 | 0.28 | 0.45 |
| MFR (1)/MFR (2) ratio (on pellets) |  | 1.2 | 1.3 | 1.5 | 0.93 |
| Characterization of compression molded specimens | | | | | |
| Flexural Modulus, MPa | 364 | 433 | 441 | 470 | 376 |
| Stress at Break, MPa | 34 | 35 | 36 | 37 | 33 |
| Elongation at Break, % | 318 | 330 | 345 | 350 | 320 |
| H.D.T 0.46 N/mm$^2$, ° C. | 91 | 101 | 105 | 111 | 94 |

(*)MFR: 190° C., 2.16 Kg

EXAMPLE 21

Stage (1): Preparation of the Masterbatch

In a mono-screw Buss 70, diameter 70 mm, length/diameter ratio L/D=17, a masterbatch was prepared by mixing the following components:
1) 95 wt % of a polyolefin matrix consisting in a polybutene homopolymer (MFR 4, measured at 190° C., 2.16 Kg) having a melting temperature of 127° C., produced by polymerizing butene-1 in the presence of a Ziegler-Natta catalyst and containing a conventional stabilizer formulation for fibers; and
2) 5 wt % of an organo-hydrotalcite (component (B)) marketed with the tradename Perkalite F100 by AKZO NOBEL, containing a saturated fatty acid as modifier; and
3) 5 wt % of a maleic anhydride-g-polypropylene (a suitable one is marketed with the tradename Polybond 3200, by Chemtura) having 0.7 wt % of maleic anhydride grafted on the polypropylene.

Stage (2) Preparation of the Polyolefin Nanocomposite Material

After the preparation of the masterbatch, in a twin-screw extruder having a screw diameter of 27 mm and a length/diameter ratio of 40 a polyolefin nanocomposite material was prepared by mixing the following components:
1) 94 parts by weight (pw) of an isotactic propylene homopolymer (MFR 25.8) having a solubility in xylene at 25° C. of about 3.9% wt, produced by polymerizing propylene in the presence of a Ziegler-Natta catalyst;
2) 6 pw of the masterbatch previously prepared.

The extrusion was carried out in stage (1) and (2) in under the following conditions:
extrusion temperature: 180° C.;
residence time in the extruder: 1.5 min;
average shear mixing: 100 sec$^{-1}$.

Preparation of the Fibres

The polyolefin nanocomposite material thus obtained was spun in a Leonard pilot plant to prepare continuous fibres. The spinning process was carried out at a measured melt temperature of 263° C. (255-260° C. temperatures settled from the extruder hopper to the head) and at a spinning rate of 2700 m/min and constant out-put of 0.6 g/min·hole.

COMPARATIVE EXAMPLE 21 (21C) AND REFERENCE EXAMPLE 21 (21R)

The comparative example 21 (21c) is the isotactic propylene homopolymer (MFR 25.8) spun as such without masterbatch added.

The reference example 21 (21r) is prepared by mixing:
94 pw of the isotactic propylene homopolymer (MFR 25.8) with
6 pw of the polybutene homopolymer (MFR 4, measured at 190° C., 2.16 Kg) used for the preparation of the masterbatch.

Table 8 reports the amounts of filler and compatibilizer in the final polyolefin materials, the spinning process conditions, the properties of the material as such and those of the fibres produced with the polyolefin material.

TABLE 8

| Examples | 21c | 21 | 21r |
|---|---|---|---|
| Process Step (2) | | | |
| Polyolefin homopolymer (MFR 25.8), pw | 100 | 94 | 94 |
| polybutene homopolymer (MFR 4, pw at190/2.16) | 0 | 0 | 6 |
| Masterbatch, pw | 0 | 6 | 0 |
| Final polyolefin nanocomposite material | | | |
| Mineral filler, wt %* | 0 | 0.3 | 0 |
| Compatibilizer, wt % | 0 | 0.3 | 0 |
| Spinning Process | | | |
| Head Temperature ° C. | 260 | 260 | 260 |
| spinning rate m/min | 2700 | 2700 | 2700 |
| MFR of polyolefin component (A) (MFR (1)) dg/min (on fibers) | 31.4 | | |
| MFR of polyolefin nanocomposite material (MFR (2)), dg/min (on fibers) | 31.4 | 23.4 | 28.1 |
| MFR (1)/MFR (2) ratio (on fibers) | 1 | 1.34 | 1.12 |
| maximum spinnability speed m/min | 4500 | 4500 | 4500 |
| Titer, dtex | 2.25 | 2.25 | 2.20 |
| Tenacity, cN/tex | 20.6 | 24.4 | 19.9 |
| Elongation at break, % | 160 | 215 | 150 |

What is claimed is:

1. A pipe comprising a polyolefin nanocomposite material comprising:
   (A) 88.5-99.7 wt. %, based upon the total weight of the polyolefin nanocomposite material, of a crystalline or semi-crystalline polybutene-1 homopolymer or a polybutene-1 copolymer comprising 0.3 to 2.0 wt. % ethylene, wherein component (A) has a melt flow rate (ISO Method 1133, 190° C., 2.16 kg) from 0.2 to 50 g/10 min;
   (B) 0.1-1.5 wt. %, based upon the total weight of the nanocomposite material, of a nanosized mineral filler comprising a hydrotalcite of the formula:

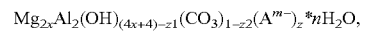

$Mg_{2x}Al_2(OH)_{(4x+4)-z1}(CO_3)_{1-z2}(A^{m-})_z \cdot nH_2O$, where x>0, (z)×(m)=z1+2z2, n>0, and A is an organic anion having a valence of m, and wherein 20% to 45% by weight of component (B) is the organic anion; and
   (C) 0.2-10 wt. %, based upon the total weight of the nanocomposite material, of a compatibilizer,
   wherein the ratio MFR (1)/MFR (2) of the melt flow rate value MFR (1) of component (A) to the melt flow rate value MFR (2) of the polyolefin nanocomposite material is at least 1.02, and
   wherein the mineral filler and compatibilizer are dispersed in the polyolefin resin at shear mixing rates from 30-300 sec$^{-1}$.

2. The pipe according to claim 1, wherein the compatibilizer is a modified polyolefin selected from the group consisting of copolymers comprising polar monomers and polyolefins grafted with grafting agents comprising polar groups.

* * * * *

UNITED STATES PATENT AND TRADEMARK OFFICE
CERTIFICATE OF CORRECTION

PATENT NO. : 9,676,920 B2  
APPLICATION NO. : 12/734858  
DATED : June 13, 2017  
INVENTOR(S) : Giuseppe Ferrara et al.

Page 1 of 1

It is certified that error appears in the above-identified patent and that said Letters Patent is hereby corrected as shown below:

In the Specification

| | | |
|---|---|---|
| Column 7 | Line 33 | Delete "C5-C8" and insert --$C_5$-$C_8$-- |
| Column 8 | Line 59 | Delete "alfa-olefin." and insert --alpha-olefin.-- |
| Column 9 | Line 58 | After "Gloss", insert --:-- |
| Column 13 | Line 21 | After "thick", insert --.-- |
| Column 13 | Line 28 | In Table 3b, delete "μ," and insert --μm,-- |
| Column 14 | Line 24 | Delete "sec-1." and insert --$sec^{-1}$.-- |
| Column 16 | Line 24 | Delete "P1005" and insert --P100S-- |
| Column 17 | Line 38 | Delete "g/cm3" and insert --$g/cm^3$-- |
| Column 17 | Line 44 | Delete "g/cm3" and insert --$g/cm^3$-- |
| Column 19 | Line 36 | Delete "g/cm3" and insert --$g/cm^3$-- |
| Column 20 | Line 26 | Delete "g/cm3" and insert --$g/cm^3$-- |
| Column 22 | Line 4 | In Table 8, delete "(MFR 4, pw at190/2.16)" and insert --(MFR 4, at 190/2.16) pw-- |

Signed and Sealed this  
Twenty-first Day of January, 2020

Andrei Iancu  
*Director of the United States Patent and Trademark Office*